(12) United States Patent
Jung (10) Patent No.: US 8,278,546 B2
(45) Date of Patent: Oct. 2, 2012

(54) MOBILE TERMINAL HAVING JOG DIAL AND CONTROLLING METHOD THEREOF

(75) Inventor: Hwan-Chul Jung, Seoul (KR)

(73) Assignee: LG Electronics Inc., Seoul (KR)

( * ) Notice: Subject to any disclaimer, the term of this patent is extended or adjusted under 35 U.S.C. 154(b) by 1729 days.

(21) Appl. No.: 11/458,142

(22) Filed: Jul. 18, 2006

(65) Prior Publication Data

US 2007/0021152 A1   Jan. 25, 2007

(30) Foreign Application Priority Data

Jul. 19, 2005   (KR) .................. 10-2005-0065311

(51) Int. Cl.
G10H 1/02   (2006.01)
(52) U.S. Cl. ...................................... 84/737
(58) Field of Classification Search .............. 84/723, 84/730, 737, 743
See application file for complete search history.

(56) References Cited

U.S. PATENT DOCUMENTS

| | | | |
|---|---|---|---|
| 6,541,690 B1 * | 4/2003 | Segers, Jr. ...................... 84/605 |
| 6,779,116 B2 * | 8/2004 | Tagawa et al. ................. 713/193 |
| 6,809,247 B2 * | 10/2004 | Yamada et al. ................. 84/612 |
| 7,042,814 B2 * | 5/2006 | Yamada et al. ............ 369/30.26 |
| 7,054,914 B2 * | 5/2006 | Suzuki et al. ................. 709/217 |
| 7,095,402 B2 * | 8/2006 | Kunii et al. ................... 345/169 |
| 7,115,807 B2 * | 10/2006 | Yamada et al. ................. 84/602 |
| 7,230,605 B2 * | 6/2007 | Rekimoto et al. ............ 345/158 |
| 7,257,072 B2 * | 8/2007 | Kikuchi ..................... 369/53.43 |
| 7,312,785 B2 * | 12/2007 | Tsuk et al. ..................... 345/156 |
| 7,345,671 B2 * | 3/2008 | Robbin et al. ................. 345/156 |
| 7,418,671 B2 * | 8/2008 | Hama et al. .................... 715/830 |
| 7,495,659 B2 * | 2/2009 | Marriott et al. ............... 345/173 |
| 7,499,040 B2 * | 3/2009 | Zadesky et al. ............... 345/204 |
| 7,627,343 B2 * | 12/2009 | Fadell et al. .................. 455/557 |
| 7,664,558 B2 * | 2/2010 | Lindahl et al. .................. 700/94 |
| 7,735,012 B2 * | 6/2010 | Naik ............................. 715/727 |
| 7,800,592 B2 * | 9/2010 | Kerr et al. ..................... 345/173 |
| 2004/0190409 A1 | 9/2004 | Inoue et al. |
| 2005/0081164 A1 | 4/2005 | Hama et al. |
| 2006/0109102 A1 * | 5/2006 | Gortz et al. .................... 340/531 |
| 2007/0021152 A1 * | 1/2007 | Jung ............................. 455/564 |
| 2007/0132837 A1 * | 6/2007 | Eom et al. .................. 348/14.02 |
| 2007/0300180 A1 | 12/2007 | Hama et al. |

FOREIGN PATENT DOCUMENTS

| | | |
|---|---|---|
| CN | 1591560 | 3/2005 |
| JP | 11-119893 | 4/1999 |
| JP | 2002-281125 | 9/2002 |
| JP | 2003-018248 | 1/2003 |
| JP | 2003-44047 | 1/2003 |
| JP | 2003-044047 | 2/2003 |

(Continued)

OTHER PUBLICATIONS

English language Abstract of JP 11-119893, Apr. 30, 1999.

(Continued)

*Primary Examiner* — Jeffrey Donels
(74) *Attorney, Agent, or Firm* — Birch, Stewart, Kolasch & Birch, LLP (57) ABSTRACT

A mobile terminal having a disc-like interface and a controlling method thereof allows various functions to be controlled and pre-stored sound effects are outputted when performing music playback music such that an improved user interface and more intuitive control can be provided.

14 Claims, 7 Drawing Sheets

FOREIGN PATENT DOCUMENTS

| | | |
|---|---|---|
| JP | 2004-112109 A | 4/2004 |
| JP | 2004-171027 | 6/2004 |

OTHER PUBLICATIONS

English language Abstract of JP 2003-044047, Feb. 14, 2003.

English language Abstract of JP 2003-018248, Jan. 17, 2003.
English language Abstract of JP 2002-281125, Sep. 27, 2002.
English language Abstract of JP 2004-171027, Jun. 17, 2004.
English Language Abstract of CN 1591560, Mar. 9, 2005.
English Language Abstract of JP 2003-44047, Feb. 14, 2003.

* cited by examiner

MOBILE TERMINAL HAVING JOG DIAL AND CONTROLLING METHOD THEREOF

This application claims priority to Korean Patent Application No. 10-2005-0065311 filed on Jul. 19, 2005 in Korea, the entire contents of which are hereby incorporated by reference in their entirety.

BACKGROUND

The present invention relates to a mobile terminal including cellular phones, Personal Communication Systems (PCSs), Personal Digital Assistants (PDAs), Hand-Held Phones (HHPs) and the like, and particularly, to a mobile terminal having a jog dial and a controlling method thereof.

In general, mobile terminals are rapidly being developed to meet increasing demands of users. In particular, mobile terminals are becoming smaller in size and lighter in weight, while providing various multimedia functions. Recently, the tendency is to provide mobile terminals with a music reproduction function (such as an MP3 player module) and a high-quality speaker unit for outputting audio data with superior sound quality.

To allow the user to control various music playback functions, related art mobile terminals include a plurality of function keys or buttons, typically located on an external portion of the mobile terminal body.

SUMMARY

The present invention provides a mobile terminal having a jog dial or other similar input device and a control method thereof that provide an improved user interface to allow more intuitive and more convenient operation and control.

DETAILED DESCRIPTION

One aspect of the present invention relates to the recognition by the present inventors about certain features of the related art, which could be improved or enhanced.

Typical music playback functions are controlled by the user upon depressing a plurality of keys or buttons provided on the related art mobile terminal. These multiple keys or buttons of the related art are cumbersome to use, susceptible to damage, and costly to assemble or repair. Also, as each key or button is typically used for a single operation, only a limited number of total functions can be provided to the user.

Also, when reproducing music using the related art mobile terminal, only a few type of playback functions (such as play, fast forward, rewind and loop) are provided, which are similar to the characteristics of typical digital music playback devices. These limited control functions only allow the user to passively listen to music without any interaction with the music being reproduced.

Based upon such recognition, the features of the present invention have been developed and will be described hereafter.

Certain known functions and structures will be omitted or will not be explained in great detail, in order to prevent the features of the present invention from being obscured. However, those skilled in the art would clearly understand that certain features that have not been described may also be part of the present invention.

Figure 1:
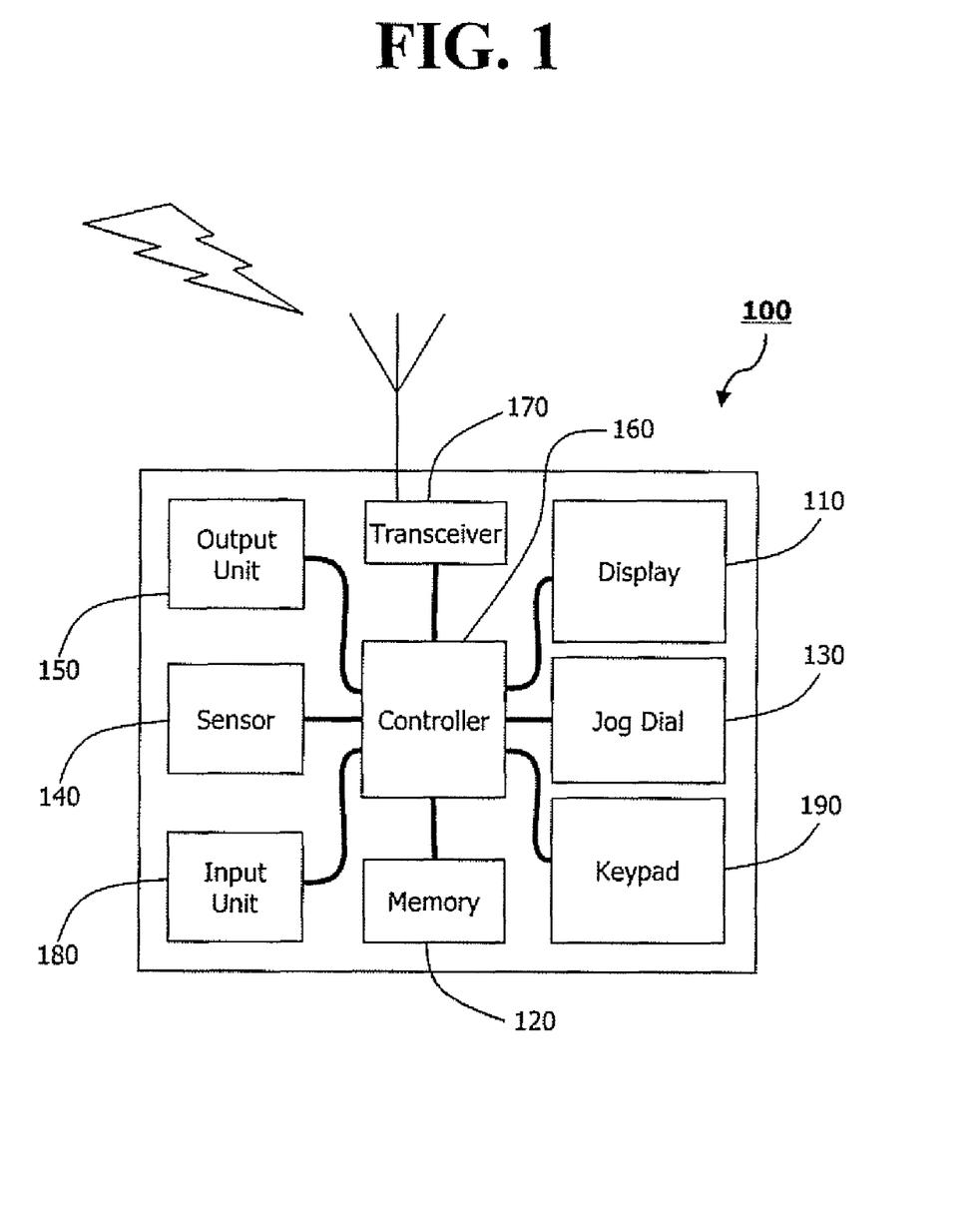
FIG. 1 shows an exemplary structure of a mobile terminal having a jog dial in accordance with an embodiment of the present invention.

FIG. 1 shows a structure of an exemplary mobile terminal having a jog dial in accordance with an embodiment of the present invention.

The present invention provides an access terminal (hereafter referred to as a mobile terminal, but can also be user equipment, a wireless communication device, etc.) having a user input detector (hereafter referred to as a jog dial, but can also be a control disk, control wheel, an actuating lever, a toggle knob, etc.).

The mobile terminal 100 of the present invention may have a display 110 (e.g., an LCD, a touch-sensitive screen, etc.) for displaying (or otherwise providing) various types of information and user interfaces, a memory 120 (or other type of storage medium) for storing data, a rotatable (or otherwise moveable) jog dial 130 for allowing the user to operate functions, a sensor 140 (or other detecting means) for sensing a rotation (or movement) of the jog dial 130 and generating a signal accordingly, an output unit 150 (e.g., speaker, sound processor, etc.) for outputting an audio signal, and a controller 160 (e.g., microprocessor, control circuitry, etc.) for controlling each of the above devices and for performing corresponding functions based upon the signal generated from the sensor 140.

The mobile terminal 100 may further comprise a transceiver 170 (e.g., radio transmitter, wireless receiver, radio frequency module, etc.) for transmitting and/or receiving signals, an input unit 180 (e.g., microphone, audio processor, etc.) for receiving an inputted audio signal, and a keypad 190 (or other input device such as buttons, a touchscreen, etc.) for allowing the user to input information, data, and the like.

When the jog dial 130 is operated (e.g., rotated), the sensor 140 senses or detects a rotation direction and a rotated degree (angle or amount) thereof, and generates a signal based upon the detected rotation direction and rotated degree. Here, the sensor 140 may be configured integrally together with the controller 160 in the form of a single processor.

The jog dial 130 (in its entirety or a portion thereof) may also be pushed in, tilted forward, backward, or sideways, or otherwise moved in a different manner in addition to or instead of being rotatable. These various degrees of movement allow the user to provide different inputs via a single input element (jog dial 130). These different inputs can all be appropriately detected by the sensor 140.

The shape of the jog dial 130 may vary. It may be relatively flush with the surface of the mobile terminal. Alternatively, the jog dial 130 may protrude above or be recessed into the surface of the mobile terminal by an appropriate amount, The overall size (e.g., diameter) may depend upon the size of the mobile terminal and where the jog dial 130 is to be located thereon.

To facilitate user operation of the jog dial 130, additional features may be introduced. For example, the surface of the jog dial 130 can have an appropriate roughness to provide more friction when the user uses his finger to move the jog dial 130. Appropriate surface treatment may be performed to achieve the desired tactile feel (and appearance) of the jog dial 130. Notches, grooves, and the like may be provided in the surface. Alternatively, protrusions, knobs, and the like may be formed on the surface. Any combination of the above or other surface processing would also be possible.

Also, indicators (e.g., lettering, symbols, LEDs, etc.) may also be provided near, on or below the surface of the jog dial 130 such that the user may visually note certain types of functions that may be performed with the jog dial 130.

Additionally, various types of feedback (visual, audible, and/or tactile) may be provided in response to how the user moves the jog dial 130. Different output lights may be displayed, beeps or sounds may be emitted, and/or vibrations may be provided to the user depending upon how the jog dial 130 is operated.

The controller 160 may perform or control certain functions based upon the signal generated from the sensor 140. For example, if a graphical user interface (GUI) or other type of interactive screen (with selectable menus, functions, contents, etc.) is being displayed on the display 110, upon receiving the signal from the sensor 140, the controller 160 may allow an indicator (e.g., cursor, pointer, etc.) to be shown on the corresponding menu, function or content. Alternatively, a particular icon or text portion itself may be highlighted, magnified or otherwise graphically depicted to stand out from the other icons or text on the screen, without any cursor or pointer being shown.

As another example, when the user rotates the jog dial 130 to the left (i.e., counter-clockwise), the sensor 140 generates a signal indicating that the jog dial 130 has been rotated to the left. The controller 160 having received the signal then moves the indicator by one column to the left or by one line in the upward direction, with an indicator being positioned at a specific portion on the screen on which a list or the like are displayed. When the user rotates the jog dial 130 to the right (i.e., clockwise), the sensor 140 generates a signal indicating that the jog dial 130 has been rotated to the right. The controller 160 having received the signal moves the indicator by one column to the right or one line downwardly.

Accordingly, the user can use the jog dial 130 for menu navigation and performing other movement on the screen. If a certain reference value (reference angle) is set, and when the jog dial 130 is rotated by an angle equal to or greater than the reference angle, the controller 160 can control the indicator to be moved by a particular interval (e.g., a plurality of columns or lines) based upon the corresponding signal generated from the sensor 140.

If the jog dial 130 is operated while music playback is being performed (e.g., the sensor 140 detects a signal generated when the jog dial 130 is rotated), the controller 160 may control functions related to the playback of music such as playing back a next song, rewinding, fast forwarding, pausing, looping, or the like, or may output a sound effect stored in the memory 120 via the output unit 150.

The operations of playing back a preceding or subsequent song, or rewinding or fast-forwarding, or outputting the sound effect may be selectively performed through user menu selection or by the signal generation from the sensor 140 based upon the rotated amount of the jog dial 130 as aforementioned and based upon the control of the controller 160 according to the signal generation.

For example, the user may view a desired function from a sub-menu (e.g., song selection, song control, sound effect insertion, or the like) of a jog dial related function setup menu, and thereafter rotates the jog dial 130 in an appropriate manner to select and perform the desired function.

Alternatively, a reference value (reference angle) may be set with respect to a rotation angle of the jog dial 130, and thereby the corresponding function can be selectively performed based upon the rotation direction and rotated degree of the jog dial 130. For setting the reference value, for example, when the jog dial 130 may be rotated by an angle equal to or greater than the reference angle in a certain direction, the sensor 140 generates a signal indicating that the jog dial 130 has been rotated by the angle over the reference angle. The controller 160 then receives the signal from the sensor 140 to thereby select a preceding or subsequent song based upon the rotation direction of the jog dial 130.

Conversely, when the jog dial 130 is rotated by an angle smaller than the reference angle in a certain direction, the sensor 140 generates a signal indicating that the jog dial 130 has been rotated by the angle smaller than the reference angle. The controller 160 then receives the signal from the sensor 140 to thereby control the playback function of the rewinding or fast-forwarding based upon the rotation direction of the jog dial 130. When the jog dial 130 is rotated in a certain direction and then rotated in opposite directions (e.g., repeatedly rotated to the right-and-left or to left-and-right), the sensor 140 generates a signal indicating that the jog dial 130 has been rotated to the right-and-left or to the left-and-right. The controller 160 having received the signal retrieves one or more sound effects stored in the memory 120 according to the rotation direction or rotated degree of the jog dial 130 to thus output the retrieved effect sound via the output unit 150.

The controller 160 may output the sound effect after pausing the music being played back, and then resumes music playback thereafter. Alternatively, the controller 160 may output the sound effect after reducing the volume of the music playback, and then return the volume to its original level after the sound effect. Also, the controller 160 may output the sound effect while performing the rewind or fast forward operation, and the music playback is resumed from the position after rewinding of fast forwarding is completed.

Furthermore, when a certain button (key or other input), such as an external (side) function key is pressed, the controller 160 may allow a particular sound effect to be outputted as a result thereof.

The sound effects outputted under the control of the controller 160 are stored in the memory 120. For example, various sound effects having certain acoustic effects, such as a scratching sound of a turn-table, clapping, musical instrument sounds, and the like may be stored. Also, the user can download his desired sound effect via a wired or wireless interface, and then store the downloaded sound effect.

Outputting various sound effects by operating the jog dial 130 during music playback allows the user to synthesize (or otherwise create) unique sounds and tunes, similar to what a disc jockey may do. The controller 160 may allow the newly created audio data to be stored in the memory 120. Namely, the controller 160 allows the music playback with the sound effects created by the user in real-time to be stored.

For outputting sound effects according to the rotation of the jog dial 130 while playing back music, the controller 160 may accordingly output an operation state on the display 110. For example, for outputting sound effects during the rewinding when the jog dial 130 is operated, the controller 160 may display an icon, text or other indicator on the display 110 to indicate that rewinding is in progress. Also, for outputting sound effects after pausing the music playback, the controller 160 may display an icon, text or other indicator on the display 110 to indicate the paused state.

In addition to controlling music playback according to the rotation of the jog dial 130, when reproducing still images, videos, animation or other content, the controller 160 can also perform various controls such as reproducing video clips or content, outputting sound effects during playback, outputting certain graphics on the screen, and the like. For example, upon sensing the rotation of the jog dial 130 during video playback, the controller 160 may output a pre-stored still image in the foreground with the video being played back in the background. Here, the controller 160 may store the video being played having the still image overlapped therewith together as a single image data file or stream. In other words, various video, image or graphical overlapping can be performed.

In addition to the components as illustrated in the Figures, the mobile terminal 100 may also be provided with an input port (e.g., terminal connector, connection jack, etc.) that allows an external device, such as a full-size keyboard or the like to be additionally connected.

Furthermore, the mobile terminal 100 may be provided with an output port (e.g., terminal connector, connection jack, etc.) for outputting image signals, audio signals, and the like to an external device.

The mobile terminal 100 may also be provided with a receiving port that may accommodate an external storage media (e.g., memory card, USB, etc.) to enable additional data storage, Other hardware and/or software interface schemes can allow various modules, devices or other elements having additional functions (e.g., a broadcast signal reception module, a camera unit, a wireless financial transaction module, etc.) to be included in the mobile terminal 100.

Various changes in shapes of mobile terminals may coincide with the trend of the convergence of digital equipment. Thus, it would be well understood by those skilled in the art that the mobile terminal 100 may be further provided with other similar or equivalent components as those mentioned above.

Figure 2:
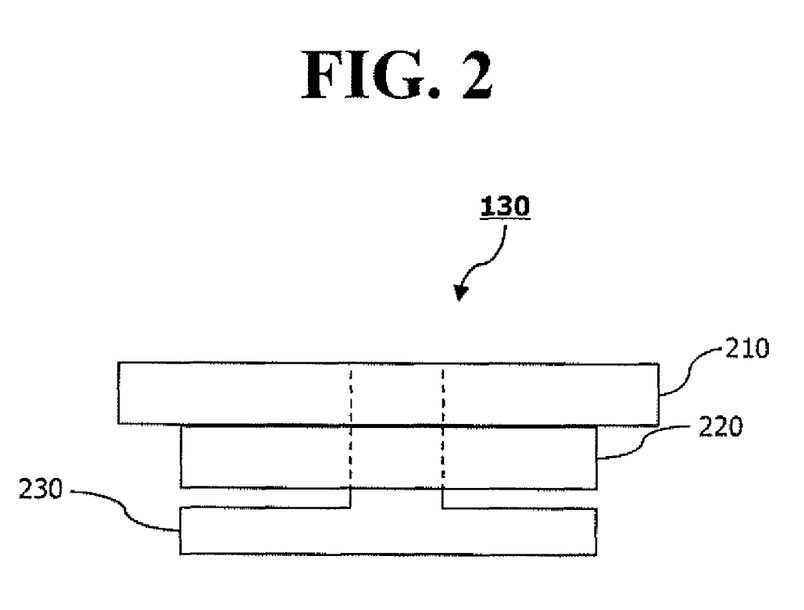
FIG. 2 shows an exemplary structure of a jog dial in accordance with an embodiment of the present invention.

An exemplary structure of the jog dial 130 will now be explained with reference to FIG. 2.

The jog dial 130 may comprise a rotation plate 210 that can be moved (rotated) by a user, a rotation portion 220 that is in contact with the rotation plate 210 to transfer a rotational force of the rotation plate 210 to the sensor 140 illustrated in FIG. 1, and a rotation axis (shaft) 230 with the rotation plate 210 and the rotation portion 220 centered thereabout. The rotation portion 220 may be provided with a plurality of reference protrusions and reference points to allow the rotation plate 210 to move in a particular rotation direction and rotation degree.

The rotation plate 210 can be fully rotated (i.e., 360 degrees) together with the rotation portion 220 in a clockwise or counter-clockwise (right or left) direction about the rotation axis 230.

The rotation plate 210 may be made of various materials (e.g., plastic, metal, glass, composites, etc.) and have an appropriate thickness and surface that provides durability for prolonged use. The surface of the rotation plate 210 (or internal portions of a translucent rotation plate) may also have graphics, text, colors, and/or other designs that are visually appealing.

Also, the rotation plate 210 may be operatively connected with the rotation portion 220 and the rotation axis 230 such that attachment and detachment can be easily performed. Namely, the user may be allowed to replace the rotation plate 210 in case of damage or for aesthetic purposes.

Additionally, this type of removable rotation plate may serve as a simple security device. Namely, the user may remove his rotation plate 210 when its functions are not in use. If his mobile terminal is lost, unauthorized use of his mobile terminal could be minimized due to the lack of the proper rotation plate 210. Various other security devices or elements (such as an RFID tag) may be used together with the attachable rotation plate 210 to provide further security.

The jog dial 130 (rotation plate 210+rotation portion 220+rotation axis 230) may be formed such that the rotation thereof can be freely performed (i.e., without any restricted rotations) or there may be rotation restrictions (limits) such that the rotation plate 210 is rotated only by limited portions or angles. For example, the user may operate the jog dial 130 in a clicked manner that can be felt and/or heard as the jog dial 130 is rotated. Also, the jog dial 130 may contain springs or other elastic members that bias the jog dial 130 to maintain an initial position, and to elastically return the jog dial 130 to its initial position after user performed rotation in the clockwise or counter-clockwise direction.

The rotation axis 230 may be attached to an outer body of the mobile terminal 100 or to an inner substrate thereof in an integrated manner or in a bonding manner. The rotation axis 230 may allow the rotation plate 210 and the rotation portion 220 to be operated as rotation elements, prevents the rotation plate 210 and the rotation portion 220 from being separated, and supports the rotation plate 210 with respect to pressure applied onto the rotation plate 210.

The jog dial 130 may be shaped as a ring with a button or other element at a center thereof. The rotation plate 210 may be a solid disc with a button (or other element) formed at the center thereof. Or the rotation plate 210 may be ring-shaped and the button or other element may be separately provided or attached to the rotation axis 230 at the end portion thereof. Namely, the rotation plate 210 may be moved (rotated) to allow the user to navigate, such as scrolling through menus, while the central function button may be pressed when the user wishes to select an item after navigation. As other buttons may be used instead of the central function button, different elements, such as a visual indicator (LED, light, etc.), input microphone of the phone, or other electronic device may be provided in place of the central function button. Function buttons or keys may be provided around the periphery of the jog dial 130 as well.

Alternatively, the jog dial 130 may be implemented as a touch-sensitive element (e.g., touch panel, touch wheel, etc.) that senses touch inputs from the user by detecting an initial contact point, a contact point change, a last contact point and the like, and generating control signals accordingly. Instead of rotating a component of the jog dial 130, such as the rotation plate 210 shown in FIG. 2, a touch-sensitive panel may sense the contact and movement of an object (such as the user's finger) and perform the appropriate controls thereof.

The touch-sensitive panel may have a stepped or offset profile orientation with the body surface. Namely, the touch-sensitive input device may be located in a groove at the surface of the mobile terminal body. This may allow the user to more easily place his finger on the touch-sensitive panel and allow easier movement thereon. The touch-sensitive panel itself may shaped appropriately to simulate the appearance and operation of a mechanical jog dial. For this touch-sensitive application, the sensor 140 shown in FIG. 1 may be modified to contain more sophisticated circuitry for detecting changes in capacitance, resistance, etc. due to user finger touches or movement. As such, the touch-sensitive panel can allow the user to simulate the rotation movements when using a jog dial by detecting user finger movements or swipes thereon.

Figure 3A:
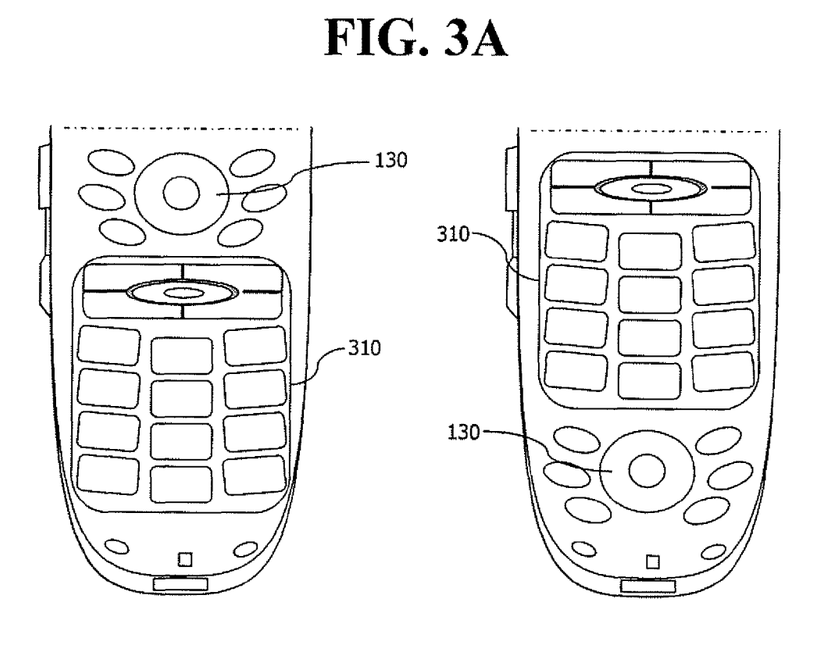
FIGS. 3A through 3C show various types of exemplary mobile terminals having a jog dial according to the present invention.
Figure 3B:
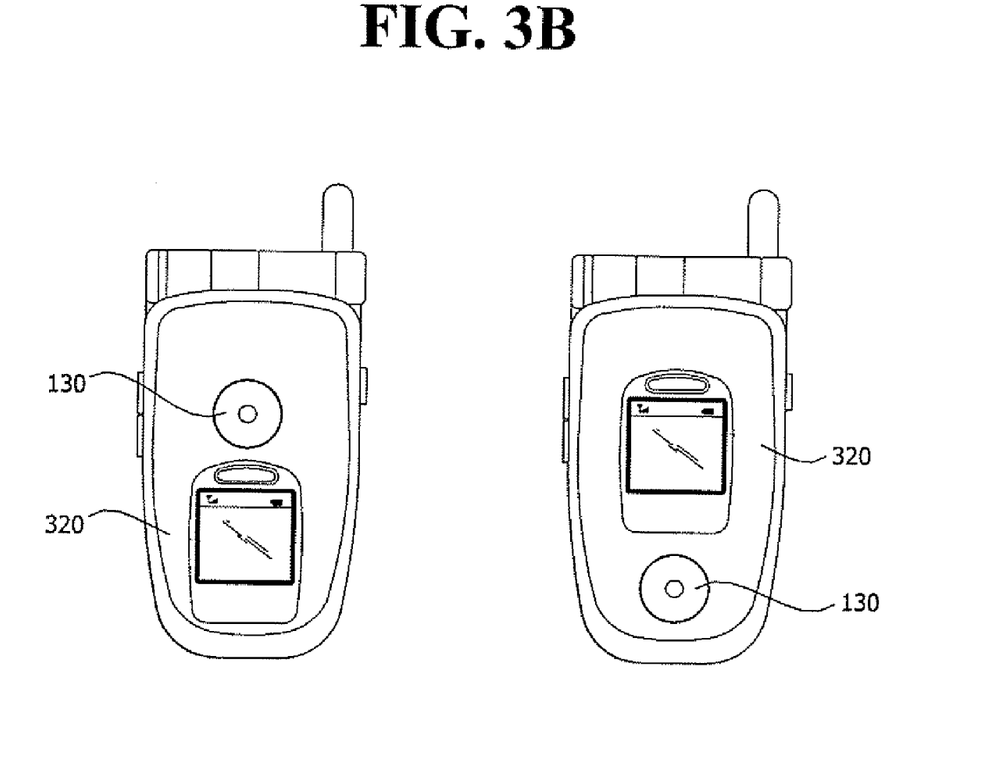
Figure 3C:
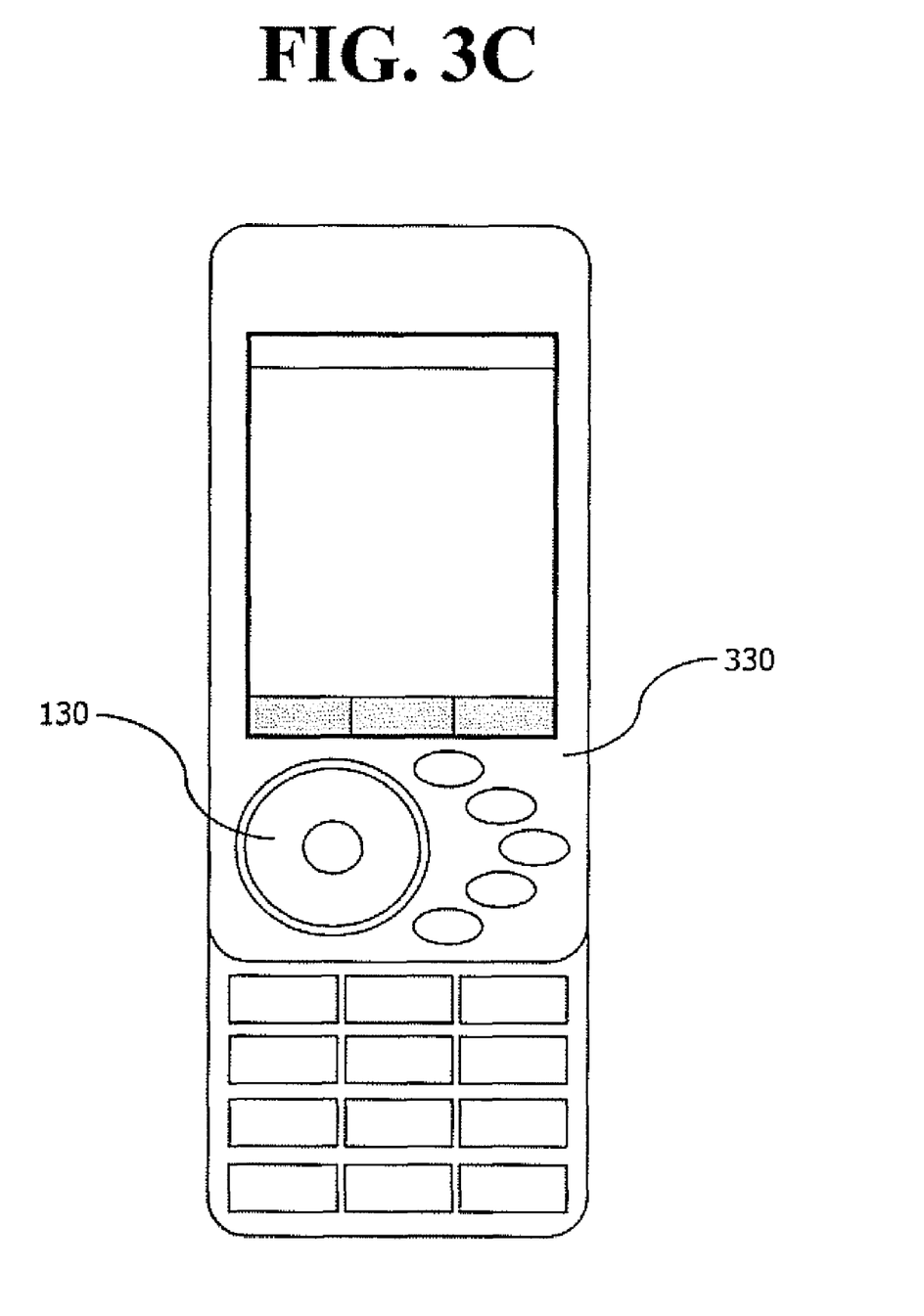

FIGS. 3A through 3C show various types of mobile terminals having a jog dial according to the present invention.

The jog dial 130 may be positioned at an upper or lower portion of the keypad 310 of the mobile terminal 100. The jog dial 130, as illustrated in FIG. 3B, may be disposed at an upper or lower portion of a cover 320 of a folder-type mobile terminal. Also, the jog dial 130 may be disposed at an upper body 330 of a slide-type mobile terminal.

The particular shapes or locations of the jog dial are not intended to be limited to those illustrated in FIGS. 3A through 3C, but rather may be appropriately modified in consideration of the shapes of mobile terminals or based upon user convenience.

Figure 4:
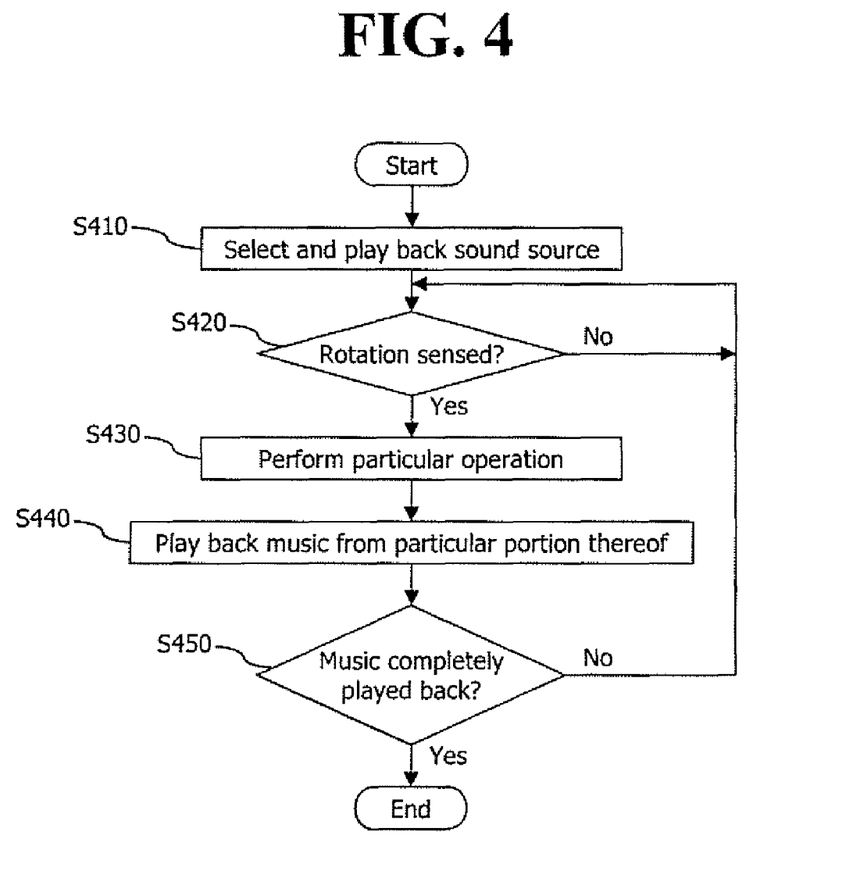
FIG. 4 is a flowchart illustrating sequential steps in a first embodiment for a method for controlling a mobile terminal having a jog dial according to the present invention.

FIG. 4 is a flowchart illustrating sequential steps in a first embodiment for a controlling method for a mobile terminal having a jog dial according to the present invention.

As illustrated in FIG. 4, the user may select at least one sound source from lists including a plurality of sound sources stored in the mobile terminal to play back the selected sound source (S410). Here, the user may use the keypad, jog dial, or both to scroll through the lists of the sound sources or move an indicator (or a cursor), thereby selecting a particular sound source.

While playing back the sound source, it is determined whether the rotation of the jog dial has been sensed (S420). If it is sensed the jog dial has been rotated, a specific operation set based upon the rotation direction or rotated degree of the jog dial is performed (S430). Here, as aforementioned, the playback function such as fast forwarding, rewinding, looping, and the like with respect to the music being played back can be controlled based upon the setup with respect to the jog dial. Also, a specific sound effect can be retrieved and outputted after reducing the volume of the music being played back or pausing the music being played back, or the playback function can be controlled and simultaneously the specific sound effect can be retrieved and outputted. In addition, upon entering a particular button such as an outer key (e.g., a side key), a separate sound effect that has been set or designated to the corresponding button can be outputted.

Afterwards, the mobile terminal plays back music according to the control of the playback function or the output of the sound effect (S440). That is, when the music has been rewound, the mobile terminal plays back the music from the rewound position. Also, when outputting the sound effect after pausing the music being played back, the mobile terminal plays back the music from the paused position.

It is then determined whether the music being played back has been completely played back (S450). Then, if it is determined that the music has not completely been played back, the steps (S420-S440) may repeatedly be performed until the music playback is completed.

Figure 5:
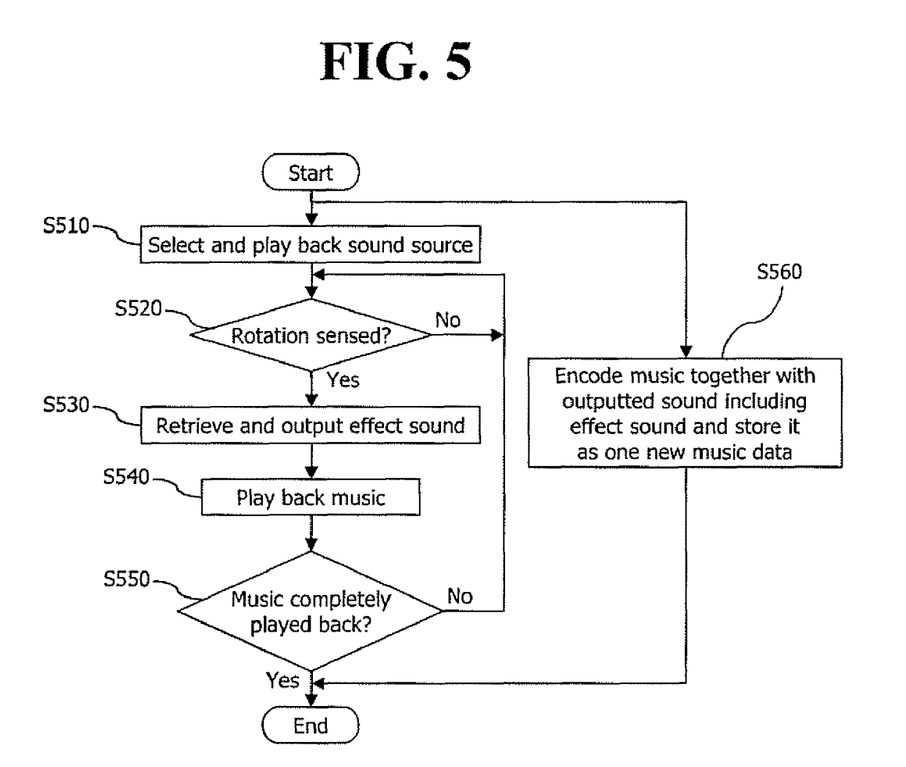
FIG. 5 is a flowchart illustrating sequential steps in a second embodiment for a method for controlling a mobile terminal having a jog dial according to the present invention.

FIG. 5 is a flowchart illustrating sequential steps in a second embodiment for a controlling method for a mobile terminal having a jog dial according to the present invention, which illustrates a flowchart for a process of synthesizing sound effects with music. Here, only the sound effect output will be explained other than the playback function control.

Upon playing back music selected by the user (S510), the mobile terminal determines whether the operation (e.g., rotation) of the jog dial has been sensed (S520). If it is sensed that the jog dial has been moved (rotated), the mobile terminal retrieves effect sound according to the rotation direction or rotated degree of the jog dial, and outputs the effect sound after adjusting the volume of the music being played (e.g., volume down to 0) or pausing the music being played back (S530). Afterwards, the mobile terminal adjusts the volume of the music being played back up to the previous level or plays back the music from the portion paused (S540). As aforementioned, it is determined whether the music being played back has been completely played back (S550). Accordingly, if it is determined that the music playback has not been completed, the steps (S520~S540) are repeatedly performed until the music is completed played back.

The outputted sound effect, on the other hand, is encoded together with the music being played back from the music playback starting time point to a music playback completing time point according to the selection or setup by the user, and then is stored as new data (S560). That is, sound outputted from the music playback starting time point to the music playback completing time point is stored as one new music data file.

The newly stored music data file can later be played back with the included sound effects in the corresponding portion of the original song.

As described above, in the mobile terminal having a jog dial in accordance with the present invention, the sensing of the rotation of the jog dial or a contact point change corresponding to the rotation (i.e., an implementation of the touch panel such as a touch wheel) can allow the easy control of the music playback function, and can also allow the output of various effect sound or the insertion of the effect sound in the music being played back according to the user's preference while playing back the music, which results in an improvement of the user's convenience and bringing of the use's interest.

The present invention provides a wireless telecommunication device comprising: a transceiver to send and receive signals via a wireless interface; a screen to display information thereon; a memory to store data therein; a control disk to receive circular user finger touch inputs; a processor providing control to the transceiver, the screen, the memory, and the control disk, to allow a user to, perform telecommunications via the transceiver, and perform navigation of data stored in the memory by user selection achieved via the control disk with information regarding the data being displayed on the screen.

The navigation of data may be used to perform playback of multimedia contents. The control disk may comprise a touch-sensitive panel that receives user finger movements thereon by detecting changes in capacitance or resistance along the panel. The control disk may comprise a rotatable plate having an appropriate thickness and diameter that receives user finger movements thereon by detecting a rotation direction and angle of the disk. The rotatable plate may be attached in a removable manner to allow user replacement thereof.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A mobile terminal having a jog dial, comprising:
 a display which displays various types of information and user interfaces;
 a memory which stores data;
 a rotatable jog dial which allows a user to operate functions;
 a sensor which senses a rotation of the jog dial and generates a signal according to the sensed rotation;
 an output unit which outputs an audio signal; and a controller which controls the display, the memory, the rotatable jog dial, the sensor and the output unit to perform functions based upon the signal generated by the sensor, wherein the controller controls outputting of sound effects stored in the memory based upon the signal generated by the sensor while the mobile terminal plays music, and wherein the controller pauses music being played, then outputs a sound effect and then continues to play the music.

2. The terminal according to claim 1, wherein the sensor senses a rotation direction of the jog dial and a rotated degree of the jog dial when it is rotated, and generates a signal based upon the sensed rotation direction and rotated degree.

3. The terminal according to claim 1, wherein the controller controls a music playback function or outputs at least one sound effect stored in the memory based upon the signal generated by the sensor.

4. The terminal according to claim 3, wherein the music playback function is one of a playback of a preceding song, a playback of a succeeding song, a rewind, a fast-forward, a pause and a loop.

5. The terminal according to claim 1, wherein the controller reduces a volume of music being played, then outputs a sound and then returns the volume up to its previous level.

6. The terminal according to claim 1, wherein the controller outputs a sound effect while rewinding or fast-forwarding music, and then plays the music.

7. The terminal according to claim 1, wherein the controller synthesizes music to be played with a sound effect corresponding to a rotation of the jog dial to form new music data in the memory.

8. The terminal according to claim 1, wherein the controller indicates an operation state of the mobile terminal on the display when a sound effect is outputted.

9. The terminal according to claim 1, wherein the jog dial comprises:
 a rotation plate which is rotated by a user;
 a rotation portion contacting the rotation plate which transfers a rotation force of the rotation plate to the sensor; and
 a rotation axis which the rotation plate and the rotation portion rotate about.

10. The terminal according to claim 9, wherein the rotation portion is provided with a plurality of reference protrusions or reference points to determine a rotation direction or rotated degree of the rotation plate.

11. The terminal according to claim 1, wherein the jog dial comprises a touch panel which senses user touch inputs and generates a signal when it senses user touch inputs.

12. A method of controlling a mobile terminal having a jog dial, comprising:
 selecting music to be played;
 playing the selected music;
 determining whether a rotation of a jog dial is sensed while playing the music; and
 when the rotation of the jog dial is sensed, controlling a playback function or outputting a sound effect,
 wherein the sound effect is outputted after adjusting a volume of the music being played or pausing the music being played.

13. The method according to claim 12, further comprising encoding the music with the sound effect to form an encoded sound, and storing the encoded sound as new music data.

14. The method according to claim 12, wherein the playback function is controlled or the sound effect is outputted, according to a rotation direction or rotated degree of the jog dial.

* * * * *